US010395142B2

(12) United States Patent
Protter et al.

(10) Patent No.: US 10,395,142 B2
(45) Date of Patent: *Aug. 27, 2019

(54) METHOD AND A SYSTEM FOR IDENTIFYING REFLECTIVE SURFACES IN A SCENE

(71) Applicant: Infinity Augmented Reality Israel Ltd., Petach-Tikva (IL)

(72) Inventors: Matan Protter, Kiryat Ono (IL); Motti Kushnir, Kiryat Ono (IL); Felix Goldberg, Haifa (IL)

(73) Assignee: Infinity Augmented Reality Israel Ltd., Petach-Tikva (IL)

( * ) Notice: Subject to any disclaimer, the term of this patent is extended or adjusted under 35 U.S.C. 154(b) by 0 days.

This patent is subject to a terminal disclaimer.

(21) Appl. No.: 16/059,865

(22) Filed: Aug. 9, 2018

(65) Prior Publication Data

US 2018/0357516 A1 Dec. 13, 2018

Related U.S. Application Data

(63) Continuation of application No. 14/872,160, filed on Oct. 1, 2015, now Pat. No. 10,049,303.

(51) Int. Cl.
*A61B 3/16* (2006.01)
*A61B 5/055* (2006.01)
(Continued)

(52) U.S. Cl.
CPC ....... *G06K 9/6267* (2013.01); *G06K 9/00201* (2013.01); *G06K 9/4661* (2013.01);
(Continued)

(58) Field of Classification Search
CPC ............. G06K 9/6267; G06K 9/00201; G06K 9/4661; G06K 9/52; G02B 2028/178;
(Continued)

(56) References Cited

U.S. PATENT DOCUMENTS

| | | | | |
|---|---|---|---|---|
| 7,201,821 | B2 | 4/2007 | Hoshino et al. | |
| 8,432,395 | B2 * | 4/2013 | Andre | G06T 7/521 345/421 |

(Continued)

FOREIGN PATENT DOCUMENTS

| | | |
|---|---|---|
| CN | 1630892 | 6/2005 |
| WO | WO2015/132981 | 9/2015 |

OTHER PUBLICATIONS

Halstead, et al., "Reconstructing Curved Surfaces From Specular Reflection Patterns Using Spline Surface Fitting of Normals", University of California at Berkeley, Jan. 1996, pp. 2-4.

*Primary Examiner* — Patricia I Young
(74) *Attorney, Agent, or Firm* — Pearl cohen Zedek Latzer Baratz LLP

(57) ABSTRACT

Methods and a system for identifying reflective surfaces in a scene are provided herein. The system may include a sensing device configured to capture a scene. The system may further include a storage device configured to store three-dimensional positions of at least some of the objects in the scene. The system may further include a computer processor configured to attempt to obtain a reflective surface representation for one or more candidate surfaces selected from the surfaces in the scene. In a case that the attempted obtaining is successful, computer processor is further configured to determine that the candidate reflective surface is indeed a reflective surface defined by the obtained surface representation. According to some embodiments of the present invention, in a case the attempted calculation is unsuccessful, determining that the recognized portion of the object is an object that is independent of the stored objects.

20 Claims, 4 Drawing Sheets

400

(51) Int. Cl.

| | |
|---|---|
| ***G06K 9/62*** | (2006.01) |
| ***G06K 9/52*** | (2006.01) |
| ***G06T 7/00*** | (2017.01) |
| ***G06K 9/00*** | (2006.01) |
| ***G06K 9/46*** | (2006.01) |
| ***G06T 19/00*** | (2011.01) |
| ***G06T 7/593*** | (2017.01) |
| ***G06T 7/73*** | (2017.01) |

(52) U.S. Cl.
CPC .............. *G06K 9/52* (2013.01); *G06T 7/0004* (2013.01); *G06T 7/593* (2017.01); *G06T 7/75* (2017.01); *G06T 19/00* (2013.01); *G06T 2200/04* (2013.01); *G06T 2207/10012* (2013.01); *G06T 2207/10028* (2013.01); *G06T 2207/30108* (2013.01)

(58) Field of Classification Search
CPC .. G02B 2028/14; G02B 27/17; G02B 27/172; G06F 3/13; G06T 7/75; G06T 7/593; G06T 7/0004; G06T 19/00
USPC .......................................................... 348/148
See application file for complete search history.

(56) References Cited

U.S. PATENT DOCUMENTS

| | | | | |
|---|---|---|---|---|
| 9,600,927 | B1 * | 3/2017 | Poursohi | G06T 15/60 |
| 2007/0035545 | A1 * | 2/2007 | Hempel | G06T 15/06 345/422 |
| 2015/0178939 | A1 * | 6/2015 | Bradski | G02B 27/017 345/633 |
| 2015/0185857 | A1 | 7/2015 | Jung | |
| 2015/0228109 | A1 | 8/2015 | Zimmerman | |

* cited by examiner

400

METHOD AND A SYSTEM FOR IDENTIFYING REFLECTIVE SURFACES IN A SCENE

CROSS REFERENCE TO RELATED APPLICATIONS

This application is a continuation application of U.S. Ser. No. 14/872,160, filed on Oct. 1, 2015, issued as U.S. Pat. No. 10,049,303 on Aug. 14, 2018, which is incorporated herein by reference in its entirety.

FIELD OF THE INVENTION

The present invention relates generally to the field of image processing, and more particularly to detecting reflective surfaces in a captured scene.

BACKGROUND OF THE INVENTION

Prior to setting forth the background of the invention, it may be helpful to set forth definitions of certain terms that will be used hereinafter.

The term "sensing device" (sometimes referred to as "camera" in computer vision) as used herein is broadly defined as any combination of one or more sensors of any type, not necessarily optical (and may include radar, ultra sound and the like). Additionally, the sensing device is configured to capture an image of a scene and derive or obtain some three-dimensional data of a scene. An exemplary sensing device may include a pair of cameras which are configured to capture passive stereo which may be used to derive depth data by comparing the images taken from different locations. Another example for a sensing device may include a structured light sensor which is configured to receive and analyze reflections of a predefined light pattern that has been projected onto the scene. Yet another important example is a 2D sensing device that captures a plurality of 2D images of the scene and further provides relative spatial data for the relationship between each 2D captured image. It should be noted that for the purposes of the present application, all dimensions in the scene can be relative (e.g., it is sufficient to have relative movement, as long as the proportion is given or derivable from the camera).

The term "reflective surface" as used herein is defined to be surface that changes the direction of a wavefront (e.g., of light or sound) at an interface between two different media so that the wavefront returns into the medium from which it originated. Specular reflection is the mirror-like reflection of light (or of other kinds of wave) from a surface, in which light from a single incoming direction (a ray) is reflected into a single outgoing direction. Such behavior is described by the law of reflection, which states that the direction of incoming light (the incident ray), and the direction of outgoing light reflected (the reflected ray) make the same angle with respect to the surface normal, thus the angle of incidence equals the angle of reflection and that the incident, normal, and reflected directions are coplanar. A partially reflective surface can be referred to any of the two types: Type one—not all the surface is reflective. Type two—level of specular reflection can be varied and a level beyond an agreeable threshold can be regarded as "reflective".

One of the challenges of computer vision is to detect the presence of, and obtain knowledge about, reflective surfaces in a scene. In specular reflections, and specifically where mirrors are involved, there is a risk that a computer-based analysis of a scene will mistakenly assume that an image captured in a reflection is a real object.

It would be advantageous to suggest some logic or a flow that will enable a computerized vision system to distinguish between real objects and their respective images, to be able to automatically detect reflective surfaces in a captured scene, and more specifically, to generate a spatial representation of the reflective surface.

SUMMARY OF THE INVENTION

Some embodiments of the present invention provide method and system for identifying reflective surfaces in a scene. The system may include a sensing device configured to capture a scene. The system may further include a storage device configured to store three-dimensional positions of at least some of the objects in the scene. The system may further include a computer processor configured to attempt to obtain a reflective surface representation for one or more candidate surfaces selected from the surfaces in the scene. In a case that the attempted obtaining is successful, computer processor is further configured to determine that the candidate reflective surface is indeed a reflective surface defined by the obtained surface representation. According to some embodiments of the present invention, in a case the attempted calculation is unsuccessful, determining that the recognized portion of the object is an object that is independent of the stored objects.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
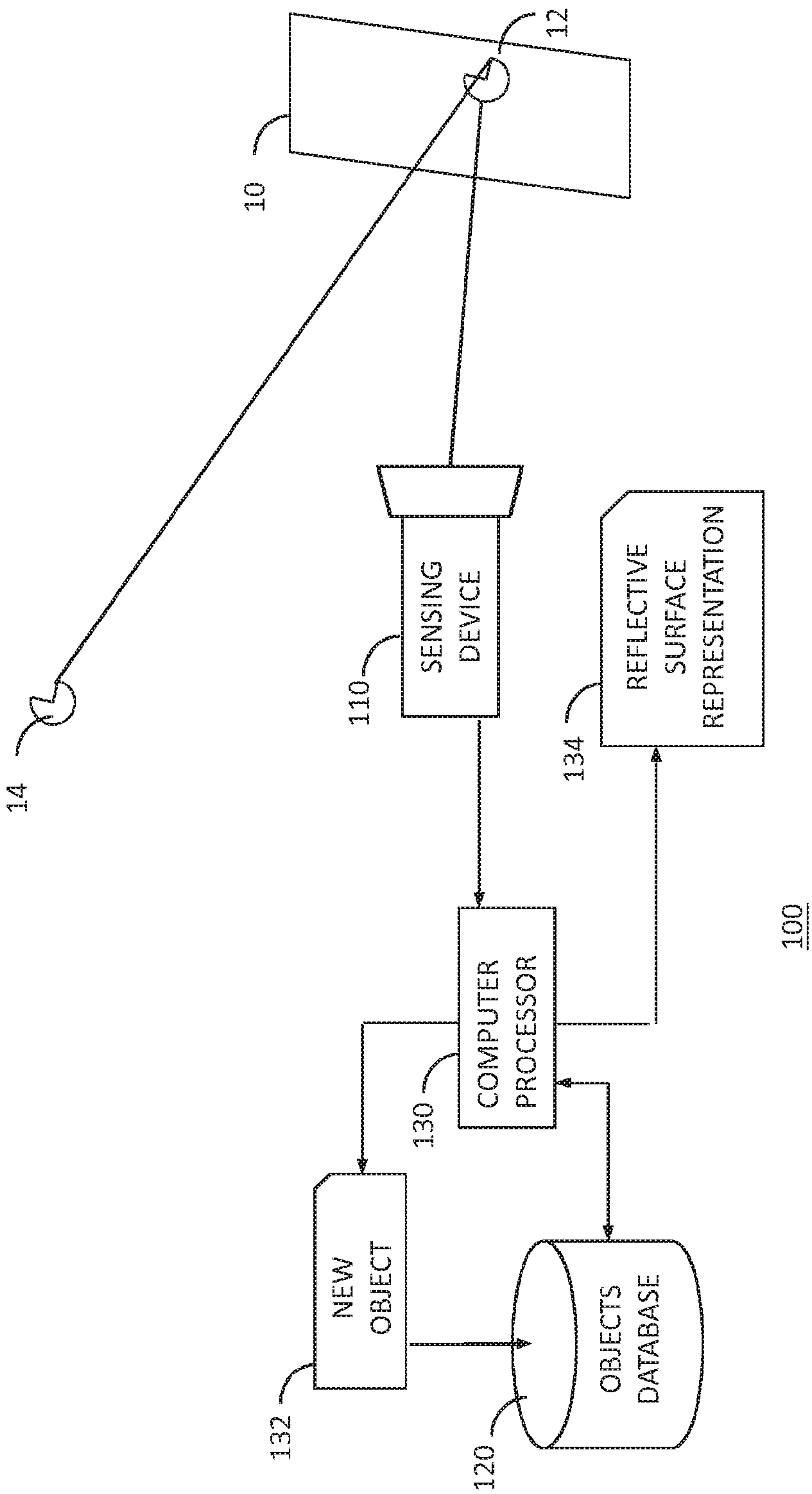
FIG. 1 is a block diagram illustrating non-limiting exemplary architectures of a system in accordance with some embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

FIG. 1 is a block diagram illustrating an exemplary architecture on which embodiments of the present invention may be implemented. System 100 may include a sensing device 110 configured to capture a scene that may include objects (e.g., 14) and surface (e.g., 10). System 100 may further include a storage device 120 configured to maintain a database of the scene which stores proximal positions of at least some of the objects and/or surfaces in the scene (including, for example, object 14). It is important to note that database 120 may also indicate which of the objects and surfaces is also reflective and so when carrying of the back ray tracking the known reflective surfaces in the scene are taken into account.

It should be noted that database 120 need not be 3D in itself and actually can be in the form of any data structure that can hold data from which relative location of objects in the scene can be derived from. Therefore, there is no need to actually store the 3D location of the points. For practical purposes, it is sufficient to store data from which the 3D location can be inferred. One non limiting example is a depth-map and the location and angles this depth-map was captured from. No 3D location of the points is provided with such a depth map, but the 3D location can be inferred.

Once a reflective surface is identified as such, it will be added to the database so it may be used in various applications that requires a knowledge of the reflective surfaces in the scene, or at minimum, differentiate between reflective surfaces and "wells" or "recesses" on an otherwise flat surface.

According to some embodiments, the storing of the data can also be a 3D model of the objects, which is not necessarily a real scan of this specific object, but rather a model of an object which is in the room.

System 100 may further include a computer processor 130 configured to attempt to obtain a reflective surface representation for one or more candidate surfaces selected from the surfaces (e.g., surface 10) in the scene. In a case that the attempted obtaining is successful, computer processor 130 is further configured to determine that the candidate reflective surface 10 is indeed a reflective surface defined by the obtained surface representation 134. Alternatively, in a case the attempted calculation is unsuccessful, determining that the recognized portion of the object is a new object 132 that is independent of the stored objects, and may be added as a new entry to storage device 120.

According to some embodiments of the present invention, the attempting is preceded by identifying, based on the sensed images, candidate reflective surfaces within the scene, and wherein the attempting is carried out on the identified candidates.

According to some embodiments of the present invention, knowledge and representations of reflective surfaces can be further used to re-analyze previous surfaces, as a new surface may change the understanding (in probabilistic terms) of surfaces already analyzed in the scene. Therefore, a certain iterative process of improving and validating the data relating to reflective surfaces in the scene is carried out.

According to some embodiments of the present invention, identifying of the candidate reflective surfaces is carried out by recognizing at least a portion of one of the objects stored on the database, wherein the recognized portion of the objects is not located at the location associated with the stored object. For example, some features of image 12 are identified as being similar (apart from some spatial tilting or panning) to object 14 which is registered with the database 120 and whose proximal location is known in the scene.

According to some embodiments of the present invention, the identifying of the candidate reflective surfaces is carried out by identifying a 3D depth pattern that is indicative of a reflective surface. More specifically, a prime "suspect" for a surface that is a reflective surface is a surface whose depth analysis based on image analysis resembles a well-defined bordered recess or "well" in an otherwise flat surface. A reflective surface, or a mirror provide similar depth notion of such a recess and a reflective surface is distinguishable from a real recess by analyzing and back tracing objects that are shown within the surface suspected as a surface. In a case that this is a real recess in a concrete surface, the object will be in its "real" position. Only in a case of a reflection, the real object is in a different position and the sensing device is actually pointed at the image of the real object.

According to some embodiments of the present invention, in a case that the candidate reflective surface is determined as a reflective surface, the computer processor is further configured to generate a virtual image of a virtual object positioned in the scene, based on the reflective surface representation.

According to some embodiments of the invention, it would be possible to substitute the aforementioned requirement of 3D positions of objects, with relative images wherein at least one of the images is treated as an anchor. This way, it would be possible to deduce a restricted volume in which a reflective surface is located. This would be achieved by applying the aforementioned back ray-tracing of the light rays. The exact surface representation in this case will not always be derived in full, but some tolerance or volume range as to its location will be provided and may still be beneficial for many applications. For example, in path planning applications it is sometimes sufficient to know that a specific range within the scene is restricted and the exact location of the restricted surface (reflective surface) is not required.

Figure 2:
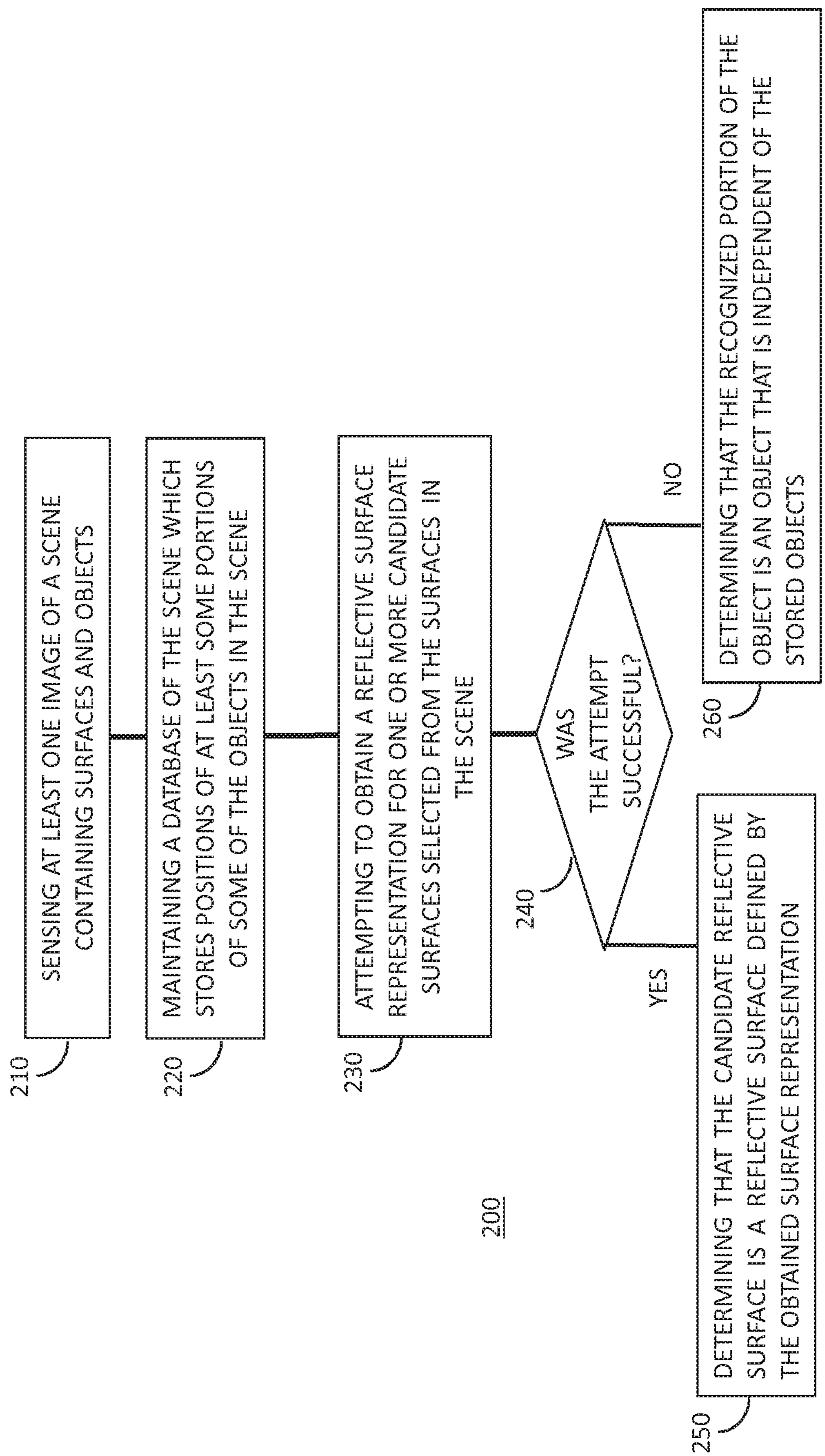
FIG. 2 is a high level flowchart illustrating non-limiting exemplary method in accordance with some embodiments of the present invention.

FIG. 2 is a high level flowchart illustrating a method 200 for method identifying reflective surface such as mirror and other planar and non-planner reflective surfaces. Method 200 may include the step of sensing at least one image of a scene containing surfaces and objects 210; Simultaneously, the method may maintain a three-dimensional database of the scene which stores three-dimensional positions of at least some of the objects in the scene 220; Then, an iterative sub process, method 200 attempts to obtain a reflective surface representation for one or more candidate surfaces selected from the surfaces in the scene 230. A check whether the attempt was successful is carried out 240. Then, in a case that the attempted obtaining is successful, determining that the candidate reflective surface is a reflective surface defined by the obtained surface representation 250. According to some embodiments of the present invention, the surface representation is achieved by a numerical approximation of a surface equation. It should be noted that the scene may already contain known mirrors so the calculation of new potential reflective surfaces may take them into account and potentially stored in the database.

According to some embodiments of the present invention, in a case the attempted calculation is unsuccessful, determining that the recognized portion of the object is an object that is independent of the stored objects 260.

According to some embodiments of the present invention, the attempting is preceded by identifying, based on the sensed images, candidate reflective surfaces within the scene, and wherein the attempting is carried out on the identified candidates.

According to some embodiments of the present invention, the identifying of the candidate reflective surfaces is carried out by recognizing at least a portion of one of the objects stored on the database, wherein the recognized portion of the objects is not located at the location associated with the stored object.

According to some embodiments of the present invention, 3D depth pattern that is indicative of a reflective surface includes a well-bordered depth step.

According to some embodiments of the present invention, wherein in a case that the candidate reflective surface is determined as a reflective surface, deriving reflectance parameters of said reflective surface by applying image processing algorithms to the recognized portion of the object and the respective object stored on the database.

According to some embodiments of the present invention, the reflectance parameters further include identifying portions of the reflective surface which are not reflective.

According to some embodiments of the present invention, wherein the reflectance parameters comprise level and type of reflectance.

According to some embodiments of the present invention, in a case that the candidate reflective surface is determined as a reflective surface, generating a virtual image of a virtual object positioned in the scene, based on the reflective surface representation. Additionally, the reflective properties derived by the analysis are used in generating a realistic image for the virtual objects integrated within the scene.

Figure 3:
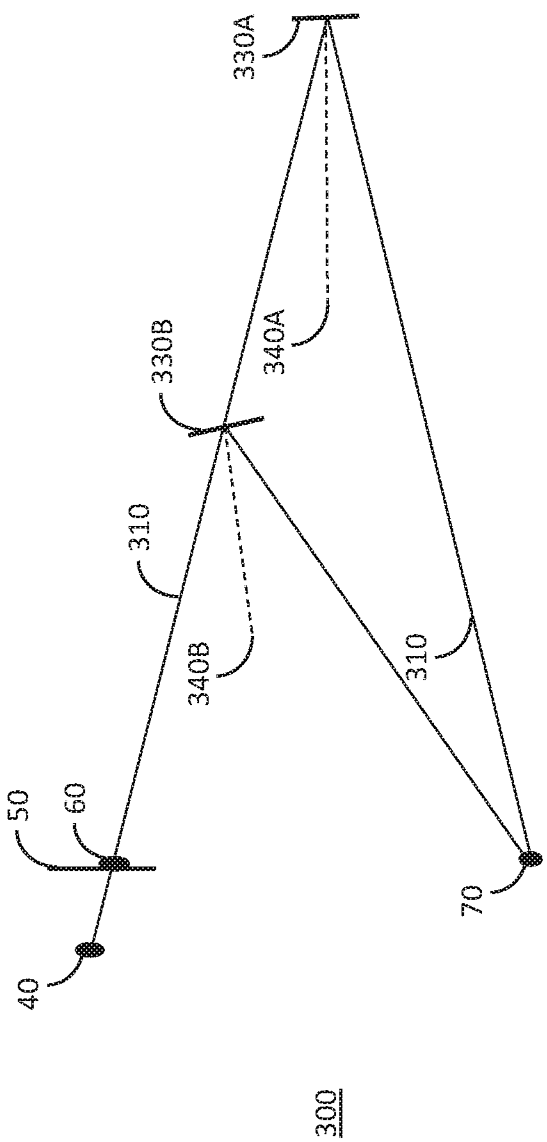
FIG. 3 is a ray diagram illustrating some optical path aspects in accordance with some embodiments of the present invention.

FIG. 3 is a ray diagram 300 illustrating some aspects of the optical path in accordance with embodiments of the present invention. Specifically, sensor array 50 of sensing device is shown as a cross section with portion 60 which represent the projection of a suspected image of an object in the scene. In attempting to locate a reflective surface representation for the suspected image of a real object 70 whose location is known in the scene, a ray 310 may be back tracked from a focal point 40 of the sensing device to a potential reflective surface 330B to real object 70 while adhering to the law of reflection given a surface normal 340B of potential reflective surface 330B. This process can be repeated iteratively for another potential reflective surface 330A having surface normal 340A.

The aforementioned process is used to map the candidate reflective surfaces, where the known location of real object 70, the surface normal and the law of reflection are serve as constraints by which the potential reflective surface are generated piece by piece based on reflective surfaces 330A and the like.

Figure 4:
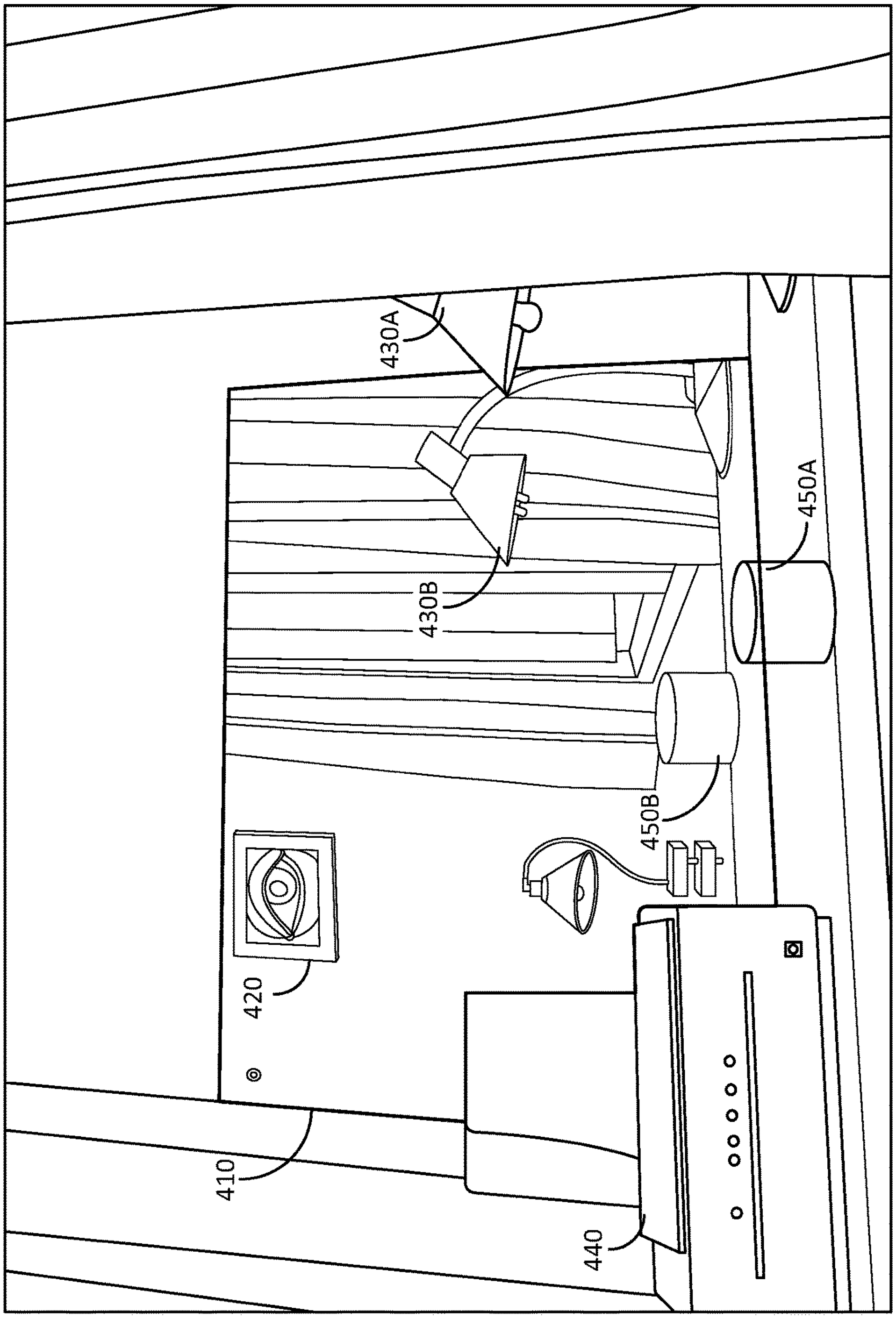
FIG. 4 is an exemplary captured image of a real scene illustrating several aspects in accordance with some embodiments of the present invention.

FIG. 4 is an exemplary captured image of a real scene illustrating several aspects in accordance with embodiments of the present invention. The scene seem to include a planar mirror surface 410 since some objects such as lamp 430A is detected as an image 430B. Additionally, other objects that are not captured in this image, such as picture 420 (depicting an eye) may be stored on the database with its accurate 3D position. In an attempt to derive the representation of the reflective surface, ray backtracking from picture 420 to the sensor array of the sensing device of the camera is carried out as explained above.

Once the reflective surface representation is derived, possibly as a numeric approximation of the surface or a plane equation of the mirror, it can be used to reflect images of virtual object introduce into the scene. For example, a cylinder 450A may be introduced into the scene as augmented reality object. In order to enable the user to perceive the virtual object more realistically, its respective reflection 450B is produced while complying with the law of reflection and other optical properties of the detected reflective surface.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

The invention claimed is:

1. A method comprising:

sensing at least one image of a scene containing surfaces and objects;

maintaining an objects database of the scene which stores approximate positions of at least some portions of some of the objects in the scene;

recognizing that at least a portion of one of the objects in the scene in the at least one image is not located at the approximate position associated with the stored object in the database;

attempting to obtain a reflective surface representation for one or more candidate reflective surfaces selected from the surfaces in the scene by back ray tracking at least one optical path from the recognized portion of the object in the scene in the at least one image to the stored approximate position associated with the object stored in the database; and in a case obtaining the at least one optical path from the recognized portion of the object in the scene to the stored approximate position associated with the object in the database is successful, determining that at least one candidate reflective surface is a reflective surface defined by the obtained reflective surface representation.

2. The method according to claim 1, wherein the reflective surface representation is achieved by a numerical approximation of a surface equation based on the back ray tracking.

3. The method according to claim 1, wherein the attempting is preceded by identifying, based on the sensed images, candidate reflective surfaces within the scene, and wherein the attempting is carried out on the identified candidates.

4. The method according to claim 3, wherein the identifying of the candidate reflective surfaces is carried out by the recognizing that the at least a portion of one of the objects in the scene in the at least one image is not located at the approximate position associated with the stored object in the database.

5. The method according to claim 4, wherein the identifying of the candidate reflective surfaces is carried out by identifying a 3D depth pattern that is indicative of a reflective surface.

6. The method according to claim 5, wherein the 3D depth pattern that is indicative of a reflective surface includes a well-bordered well.

7. The method according to claim 1, wherein in a case the attempted obtaining is unsuccessful, determining that the recognized portion of the object is an object that is independent of the stored objects.

8. The method according to claim 7, further adding the object as a newly recognized object to the database.

9. The method according to claim 1, wherein in a case that the candidate reflective surface is determined as a reflective surface, deriving reflectance parameters of said reflective surface by applying image processing techniques to the recognized portion of the object and the respective object stored on the database.

10. The method according to claim 9, wherein the reflectance parameters further include identifying portions of the reflective surface which are not reflective.

11. The method according to claim 9, wherein the reflectance parameters comprise level and type of reflectance.

12. The method according to claim 1, wherein in a case that the candidate reflective surface is determined as a reflective surface, rendering a virtual image of a virtual object positioned in the scene, based on the reflective surface representation.

13. A method comprising:

sensing at least two images of a scene containing objects;

obtaining spatial alignment data comprising a relative alignment between at least two of the sensed images;

for each of the sensed images, attempting to identify an object that appears in at least two of the images;

recognizing that at least a portion of the identified object as it appears in a first one of the at least two images is not located at the approximate position associated with a portion of the identified object as it appears in a second one of the at least two images;

calculating, based on constraints derived from each of the attempts, a volume sector within the scene which contains a reflective surface onto which the identified object is reflected by back ray tracking at least one optical path from the portion of the identified object as it appears in a first one of the at least two images to the portion of the identified object as it appears in a second one of the at least two images; and providing the volume sector within the scene as a range of the location in which the reflective surface appears.

14. A system comprising:

a camera configured to sense at least one image of a scene containing surfaces and objects;

a memory configured to maintain a database of the scene which stores positions of at least some portions of some of the objects in the scene; and a computer processor configured to:

recognize that at least a portion of one of the objects in the scene in the at least one image is not located at the approximate position associated with the stored object in the database, attempt to obtain a reflective surface representation for one or more candidate reflective surfaces selected from the surfaces in the scene, by back ray tracking at least one optical path from the recognized portion of the object in the scene in the at least one image to the stored approximate position associated with the object stored in the database, and in a case obtaining the at least one optical path from the recognized portion of the object in the scene to the stored approximate position associated with the object in the database is successful, the computer processor is further configured to determine that the candidate reflective surface is a reflective surface defined by the obtained surface representation.

15. The system according to claim 14, wherein the attempting is preceded by identifying, based on the sensed images, candidate reflective surfaces within the scene, and wherein the attempting is carried out on the identified candidates.

16. The system according to claim 15, wherein the identifying of the candidate reflective surfaces is carried out by the recognizing that the at least a portion of one of the objects in the scene in the at least one image is not located at the location associated with the stored object.

17. The system according to claim 15, wherein the identifying of the candidate reflective surfaces is carried out by identifying a 3D depth pattern that is indicative of a reflective surface.

18. The system according to claim 14, wherein in a case the attempted obtaining is unsuccessful, determining that the recognized portion of the object is an object that is independent of the stored objects.

19. The system according to claim 14, wherein in a case that the candidate reflective surface is determined as a reflective surface, the computer processor is further configured to generate a virtual image of a virtual object positioned in the scene, based on the reflective surface representation.

20. A system comprising:

a camera configured to sense at least two images of a scene containing objects; and a computer processor configured to obtain spatial alignment data comprising a relative alignment between at least two of the sensed images, wherein for each of the sensed images, the compute processor is configured to attempt to identify an object that appears in at least two of the images, wherein the computer processor is configured to:

recognize that at least a portion of the identified object as it appears in a first one of the at least two images is not located at the approximate position associated with a portion of the identified object as it appears in a second one of the at least two images, calculate, based on constraints derived from each of the attempts, a volume sector within the scene which contains a reflective surface onto which the identified object is reflected by back ray tracking at least one optical path from the portion of the identified object as it appears in a first one of the at least two images to the portion of the identified object as it appears in a second one of the at least two images, and provide the volume sector within the scene as a range of the location in which the reflective surface appears.

* * * * *